(12) United States Patent
Hodges et al.

(10) Patent No.: US 11,794,897 B2
(45) Date of Patent: Oct. 24, 2023

(54) AERIAL DRONE

(71) Applicant: LIVELINK AEROSPACE LTD, Havant (GB)

(72) Inventors: Robin Hodges, Froxfield (GB); Tom Reader, Fareham (GB); Simon Raimbaud, Aberystwyth (GB); David Youngs, Lavant (GB)

(73) Assignee: LIVELINK AEROSPACE LTD, Havant (GB)

( * ) Notice: Subject to any disclaimer, the term of this patent is extended or adjusted under 35 U.S.C. 154(b) by 106 days.

(21) Appl. No.: 17/471,762

(22) Filed: Sep. 10, 2021

(65) Prior Publication Data
US 2022/0097847 A1    Mar. 31, 2022

(30) Foreign Application Priority Data
Sep. 15, 2020 (GB) .................................... 2014511

(51) Int. Cl.
| | | |
|---|---|---|
| *B64C 39/02* | (2023.01) | |
| *B64D 1/00* | (2006.01) | |
| *B64D 47/00* | (2006.01) | |
| *G05D 1/12* | (2006.01) | |
| *B64U 10/13* | (2023.01) | |
| *B64U 101/00* | (2023.01) | |

(52) U.S. Cl.
CPC .............. *B64C 39/024* (2013.01); *B64D 1/00* (2013.01); *B64D 47/00* (2013.01); *G05D 1/12* (2013.01); *B64C 2211/00* (2013.01); *B64U 10/13* (2023.01); *B64U 2101/00* (2023.01); *B64U 2201/00* (2023.01)

(58) Field of Classification Search
CPC ... B64C 39/024; B64C 2211/00; B64C 25/68; B64D 1/00; B64D 5/00; B64U 10/13; B64U 2101/00
See application file for complete search history.

(56) References Cited

U.S. PATENT DOCUMENTS

| | | | |
|---|---|---|---|
| 9,085,362 B1 * | 7/2015 | Kilian | .................. B64C 39/024 |
| 9,561,852 B1 * | 2/2017 | Beaman | ................ B64C 39/024 |
| 2017/0144756 A1 * | 5/2017 | Rastgaar Aagaah | ..... B64D 3/00 |

(Continued)

FOREIGN PATENT DOCUMENTS

| | | |
|---|---|---|
| CN | 108502176 A * | 9/2018 |
| CN | 208233364 | 12/2018 |

(Continued)

OTHER PUBLICATIONS

Extended European Search Result for European Patent Application No. 21196636.1 dated Jan. 28, 2022 (10 pages).

(Continued)

*Primary Examiner* — Michael H Wang
(74) *Attorney, Agent, or Firm* — Barnes & Thornburg LLP

(57) ABSTRACT

An aerial drone is configured to capture aerial objects. The aerial drone has an airframe, a propulsion system mounted to the airframe, and a capturing device mounted to the airframe. The propulsion system is configured to control the movement of the aerial drone. The capturing device is configured to receive and capture an aerial object located above the aerial drone. A method of capturing an aerial object using the aerial drone is also contemplated.

19 Claims, 6 Drawing Sheets

(56) References Cited

U.S. PATENT DOCUMENTS

2018/0105271 A1* 4/2018 Wypyszynski ......... F41H 11/04
2020/0108924 A1* 4/2020 Smith ................. F41H 13/0043
2020/0290737 A1* 9/2020 Ivans ..................... B64D 25/12

FOREIGN PATENT DOCUMENTS

CN          106741889         7/2020
WO        2018122830 A1      7/2018
WO     WO-2021250332 A1 *  12/2021    ........... B64C 39/024

OTHER PUBLICATIONS

Combined United Kingdom Search and Examination Report, dated Feb. 26, 2021.

* cited by examiner

AERIAL DRONE

The present application claims priority, under 35 U.S.C. § 119(a), of Great Britain Application No. 2014511.6 which was filed Sep. 15, 2020 and which is hereby incorporated by reference herein.

BACKGROUND

The present disclosure relates to an aerial drone, in particular, an aerial drone configured to capture aerial objects. The present disclosure also provides a method of capturing an aerial object using such an aerial drone.

Increasingly, the usage of unmanned aerial vehicles (UAVs) is becoming more prevalent in public and private spaces. UAVs are normally controlled remotely by a user or by automated software and typically incorporate a camera for aerial photography or surveillance purposes. The operation of UAVs over, or in the vicinity of, sensitive areas or facilities, such as airports or sports events, can represent a potential safety and privacy risk. There have been recent events where air traffic had to be suspended temporarily due to the sighting of drones in the vicinity of airports.

Various counter-drone mechanisms have been developed throughout the years to eliminate or capture unwanted UAVs. Some counter-drone mechanisms involve a device configured to deploy capturing nets that are released towards an unwanted UAV. Other mechanisms involve a device configured to disrupt global positioning system (GPS) signals received by the drone and other communication between the drone and its corresponding controller. Some other systems involve deploying a drone with a deployable net that can be shot towards the unwanted UAV or can be deployed so that the net hangs down from the drone. However, many of such mechanisms present significant drawbacks.

Existing counter-drone mechanisms may not be sufficiently accurate and require multiple attempts in order to capture an unwanted UAV or the range of the counter-drone mechanism is limited to close proximity. Many of said available counter-drone mechanisms, when deployed, will cause the unwanted UAV to descend without control, which could impact the safety of nearby civilians when the unwanted UAV is disabled mid-flight. Further, many of the available counter-drone mechanisms, such as deployed nets, cannot be used again once deployed. It therefore can be costly and time consuming if there are multiple unwanted UAVs present and if it takes multiple attempts, with long delays between the attempts, in order to successfully disable each one of the UAVs.

Accordingly, it would be desirable to provide a reusable and portable counter-drone system that is adapted to capture aerial objects, such as unwanted UAVs, in a safe, efficient and reliable manner.

SUMMARY

According to a first aspect of the present invention, there is provided an aerial drone. The aerial drone comprises an airframe, a propulsion system mounted to the airframe and a capturing device mounted to the airframe. The propulsion system is configured to control the movement of the aerial drone. The capturing device is configured to receive and capture an aerial object located above the aerial drone. The capturing device is configured to receive and capture an aerial object located above the aerial drone during flight.

By providing the aerial drone with a capturing device that is configured to receive and capture an aerial object located above the aerial drone, the present invention is capable of accurately and safely capturing unwanted aerial objects, such as other UAVs or drones, by approaching them from underneath. The inventors of the present invention have found that capturing foreign aerial objects from underneath is safer because, once the aerial object is securely received within the capturing device, the risk of the aerial object falling out mid-flight is significantly reduced. Furthermore, it has been found with the present invention that more than one aerial object can be caught with a single capturing device during a single flight of the aerial drone. This means that the aerial drone does not need to land to dispose of the first captured aerial object in order to pursue the capture of subsequent aerial objects.

The capturing device may comprise a net. Alternatively, the capturing device may comprise a basket. The capturing device may comprise a mesh material, which may be flexible or rigid. Alternatively, the capturing device may comprise a fabric material.

The capturing device may be mounted to the airframe in such a manner that the capturing device can receive and capture an aerial object located above the airframe of the aerial drone. The capturing device may be deployed when an aerial object is to be captured by the aerial drone. The capturing device may be configured to change between a closed configuration, in which the capturing device cannot receive and capture an aerial object located above the aerial drone, and an open configuration, in which the capturing device can receive and capture an aerial object located above the aerial drone. Alternatively, the capturing device may be in the open configuration during an entire flight of the aerial drone.

When the capturing device comprises a net, the net is arranged to sag or droop from the airframe. This allows the capturing device to form a suitable capturing volume or capturing zone for receiving and entangling and thereby capturing one or more aerial objects. If the aerial object is a drone comprising a plurality of rotors, the net advantageously entangles with the rotors of the drone in order to retain and capture the drone and to prevent the drone from potentially escaping the capturing device.

The airframe defines a pitch axis, a yaw axis and a roll axis of the aerial drone. The propulsion system is configured to control movement of the aerial drone about the pitch, yaw and roll axes of the aerial drone. The capturing device may have a top surface and a bottom surface. The capturing device may be arranged at a position along or parallel to the yaw axis of the aerial drone. A portion of the top surface of the capturing device may be configured to face a direction substantially parallel to the yaw axis of the aerial drone. Arranging the capturing device in such a manner ensures that the capturing device is facing in an upward direction so that the capturing device is configured to receive and capture aerial objects located above the aerial drone.

The airframe may comprise aluminium, titanium or a composite material such as carbon fibre or glass fibre. Aluminium is preferable as it is a lightweight, strong material that can easily be worked with. The airframe may comprise a combination of different materials, such as aluminium, titanium or a composite material. The total weight of the airframe may be between 5 and 20 kilogrammes (kg). The total weight of the airframe may be around 10 kg.

The capturing device may be configured to define a capturing zone for receiving an aerial object. The capturing zone may be configured to be accessible from above the capturing device. The capturing zone may be a capturing area or volume defined by the capturing device. Once a foreign aerial object is targeted by the aerial drone, the aerial drone is arranged to approach the aerial object from underneath so that the aerial object is received by and retained within the capturing zone defined by the capturing device.

The capturing device may be mounted to one of the sides of the airframe. The capturing device may be mounted to the periphery of the airframe. The capturing device may be mounted within the airframe.

In some embodiments, the capturing device may be mounted on top of, or above, the airframe. In such embodiments, the aerial drone may further comprise a support frame mounted to the airframe. The support frame may be configured to support the capturing device and elevate the capturing device above the airframe, holding the capturing device in an elevated position above the airframe. The support frame may extend upwards from the airframe of the aerial drone. If the capturing device comprises a capturing net, the support frame and the capturing net may resemble a basket-like structure.

In embodiments where the propulsion system of the aerial drone includes motorised propellers and the capturing device comprises a net, the support frame elevating the capturing device reduces the risk of the capturing device from being entangled with the propellers. Furthermore, by elevating the capturing device, the capturing zone is elevated and thus there is also a reduced risk of a targeted aerial object or drone colliding against the motorised propellers during the capturing process. Furthermore, by elevating the capturing device, the capturing device may define a capturing zone that is not limited by the size, or footprint, of the airframe and that may be greater than the footprint of the airframe.

In some embodiments, the aerial drone may define a central aperture. The airframe of the aerial drone may define a central aperture. In such embodiments, the capturing device may be configured to extend across the central aperture of the airframe. The capturing device may be located within the central aperture of the airframe. The central aperture may define an opening through which an aerial object may be received into the capturing device.

The airframe may be circular. Alternatively, the airframe may be in the shape of a polygon. For example, the airframe may be in the shape of a triangle, a square, a hexagon or an octagon. The airframe may be hoop-shaped.

A width of the central aperture may be greater than about 50 centimetres. A width may refer to the diameter of the central aperture. A width of the central aperture may be greater than about 100 centimetres. A width of the central aperture may be less than about 500 centimetres. A width of the central aperture may be less than about 200 centimetres. A width of the central aperture may be between about 50 centimetres and about 500 centimetres. A width of the central aperture may be between about 100 centimetres and about 200 centimetres.

The propulsion system may comprise a plurality of propellers and a plurality of motors each configured to operate a corresponding propeller. Both the propellers and corresponding motors may be evenly distributed on the airframe. The plurality of propellers may comprise at least four propellers and the plurality of motors may comprise a number of motors corresponding to the number of propellers. The plurality of propellers may comprise at least six propellers and the plurality of motors may comprise a number of motors corresponding to the number of propellers. The plurality of motors may comprise a plurality of electric motors, preferably brushless direct current (DC) electric motors.

The propulsion system may further comprise a plurality of electronic speed controllers (ESC). The plurality of ESCs may comprise a number of ESCs that corresponds to the number of motors. Each ESC is configured to control the movement and speed of each motor. The plurality of ESCs are arranged to be electronic communication with the flight control system, or flight controller, of the aerial drone.

The propulsion system may comprise at least six propellers and at least six corresponding motors. Providing more than six propellers and more than six motors, ensures there is a degree of redundancy in the propulsion system in case any of the propellers fail or break. The propulsion system may further comprise at least six electronic speed controllers (ESCs).

The propellers of the propulsion system may be mounted to the top of the airframe. Alternatively, the propellers of the propulsion system may be mounted to the bottom of the airframe. The propeller of the propulsion system may be mounted to the bottom of the airframe in embodiments where the capturing device is mounted above the airframe in order to reduce the risk of entanglement of the capturing net of the capturing device with the propellers. Mounting the propellers of the propulsion system underneath the airframe also reduces the risk of damage of the propellers if an aerial object were to collide with the aerial drone during an approach from below the aerial object.

The aerial drone may comprise an on-board flight controller or flight control system. The flight control system is configured to provide motor output signals to the motors of the propulsion system. The flight control system may be configured to receive input from a user controller or from a flight guidance system.

The aerial drone may further comprise a plurality of propeller guards for preventing the capturing device from being caught by the propellers. Each propeller guard may be mounted to the airframe at a location in the vicinity of a corresponding propeller. The propeller guards may entirely or partially surround the propellers. The propeller guards may also reduce the risk of a targeted aerial object from colliding with the propellers during the capturing process. The capturing process of the present invention may consist of capturing the targeted aerial object by approaching the object from below and capturing the object with the capturing device.

Preferably, the aerial drone further comprises a power source for providing power to the propulsion system. The aerial drone may comprise a plurality of power sources. For example, the plurality of power sources may comprise a plurality of lithium-ion polymer (LiPo) batteries. The LiPo batteries may each have a battery capacity of about 10 Ampere-hour (Ah). The plurality of the LiPo batteries may comprise a two-cell (2S) LiPo battery, a three-cell (3S) LiPo battery, a four-cell (4S) LiPo battery, a five-cell (5S) LiPo battery or a six-cell (6S) LiPo battery. The aerial drone may have a flight range of 5 kilometres (km) and sufficient flight time to carry out a capture mission. The flight time of the aerial drone may be at least five minutes. Employing at least two 10 Ah 5S LiPo batteries ensures that the aerial drone has enough flight time and range to carry out capture and surveillance missions.

The aerial drone may further comprise a detecting system mounted to the airframe configured to detect the presence of an aerial object. The detecting system, which may also be referred to as a 'foreign object detecting (or detection)

system' or 'presence detecting (or detection) system', may be configured to detect the presence of an aerial object that is in the air. The detecting system may comprise a detection sensor. The detecting system may comprise a detection sensor configured to face any direction. Preferably, the detecting system may comprise a detection sensor configured to face upwards. The term 'upwards' refers to a direction away from the ground, which may be parallel to the yaw axis of the aerial drone. This is particularly advantageous for detecting and tracking foreign aerial objects located above the aerial drone in order to safely and effectively approach and capture them.

The detection sensor may be mounted on a gimbal, which is in turn mounted to the airframe, so that the detection sensor may rotate with respect to the yaw, roll and pitch axes of the aerial drone. The detection sensor may be mounted to the airframe alongside, above or below the capturing device.

The detection sensor may be a camera (in other words, a digital imaging sensor), a thermal imaging sensor, a radar-based sensor, a Lidar-based sensor, an acoustic sensor or an infrared sensor. The detecting system may comprise a plurality of detection sensors. The plurality of detection sensors may comprise any combination of detection sensors presented in the present disclosure. For example, the detecting system may comprise a first detection sensor for low light operations and a second detection sensor for depth perception.

The detecting system may comprise a tracking system for targeting and tracking an aerial object based on detection sensor data received from the detection sensor. The tracking system may comprise an on-board computer mounted to the airframe that is in communication with the detection sensor or plurality of detection sensors. The tracking system may be configured to provide identification information about an aerial object. The tracking system may execute a computer program that uses the detection sensor data in order to track a particular aerial object. The tracking system allows a user of the aerial drone to identify and track a particular aerial object in order to assist with the capturing process. The identification information may allow a user remotely controlling the aerial drone to identify whether a particular foreign aerial object is another aerial drone or not. The tracking system may be able to identify and distinguish whether a cloud or a bird has been detected by the detection sensor.

The aerial drone may be configured to communicate with a flight guidance system such that a flight path of the aerial drone can be controlled. The flight guidance system may comprise an on-board computer mounted to the airframe. Alternatively, the flight guidance system may comprise a processing unit located on the ground, and not on board the aerial drone. In embodiments where the flight guidance system comprises a ground processing unit, the flight guidance unit is configured to establish electronic communication with the flight controller (or flight control system) of the aerial drone. The or each aerial drone may be configured to be controlled by a mission control hub (ground processing unit or ground flight guidance system). Through the mission control hub, each aerial drone may receive commands. For example, through the mission control hub, each aerial drone may receive commands to launch and to pursue and capture foreign aerial objects. Preferably, the mission control hub may be located on the ground (in other words, not on-board the aerial drone). The mission control hub may be configured to receive command inputs from a user. The mission control hub may be in electronic or remote communication with the or each aerial drone. The mission control hub may comprise a display interface for displaying information received from the or each aerial drone. Advantageously, as the or each aerial drone is adapted to be in electronic communication with the mission control hub, the or each aerial drone can receive further or updated mission commands from the mission control hub during flight.

In the present disclosure, there is provided an aerial drone system or aerial drone kit comprising a processing unit, a flight guidance system, or a mission control hub, as described in the present disclosure, and at least one aerial drone, in accordance with any aspect of the present disclosure.

The on-board computer of the flight guidance system may be the same on-board computer as the on-board computer of the tracking system. In other words, the aerial drone may comprise a single on-board computer, wherein the on-board computer forms part of the tracking system and the flight guidance system. In other words, the tracking and flight guidance systems may be hosted on a single computer on board the aerial drone. The flight guidance system may be configured to receive tracking data from the tracking system.

The aerial drone may comprise a first inertial measurement unit (IMU) configured to provide navigational data relating to the aerial drone to the flight guidance system. The flight guidance system may be configured to determine the location of an aerial object relative to the aerial drone.

The aerial drone may comprise a second inertial measurement unit (IMU) configured to provide navigational data relating to the aerial drone to the flight control system. The flight control system may comprise the second IMU.

The navigational data may comprise information relating to the acceleration, velocity and/or relative orientation of the aerial drone during flight.

The flight guidance system may be in electronic communication with the flight control system. The flight guidance system may provide information to the flight control system, which in turn controls the propulsion system of the aerial drone, in order for the aerial drone to approach and follow a target aerial object or drone.

The aerial drone may further comprise a catch detection system configured to detect whether an aerial object has been caught, or captured, by the capturing device. The catch detection system enables a user operating the aerial drone remotely to monitor whether a targeted foreign aerial object has been successfully captured.

The catch detection system may be configured to monitor motor speed commands provided by a flight control system to the propulsion system. The catch detection system may also be configured to monitor the acceleration of the aerial drone. The acceleration preferably refers to a current acceleration of the aerial drone. The acceleration of the aerial drone that is monitored by the catch detection system may be a linear acceleration of the aerial drone, an angular acceleration of the aerial drone or both. An angular acceleration of the aerial drone may be at least one angular acceleration of the aerial drone about its yaw axis, roll axis or pitch axis.

Based on such monitored motor speed commands and acceleration, the catch detection system can determine whether an aerial object has been captured by the capturing device of the aerial drone. For example, the catch detection system may monitor the relationship between (a) the sum of the motor speed commands an on-board flight controller sends to the ESCs of the propulsion system and (b) the resulting overall linear acceleration of the aerial drone.

In another example, the catch detection system may monitor the relationship between (c) the difference in the motor speed commands an on-board flight controller sends to the ESCs of the propulsion system about each rotational axis, and (d) the resulting overall angular acceleration of the aerial drone about each rotational axis.

When a foreign aerial drone is captured or caught by the aerial drone of the present invention, more power output will be required from the motors of the propulsion system in order to maintain a similar level of acceleration (either linear or angular, or both) of the aerial drone. The catch detection system will be able to monitor for such changes based on the motor speed commands. The catch detection system may be configured to notify a user of the aerial drone that a foreign aerial object has been successfully captured by the capturing device.

The airframe may comprise a top portion and a bottom portion. The top portion may define the central aperture of the airframe and the bottom portion may be located below the centre of the central aperture. The airframe may comprise a plurality of connecting members connecting the bottom portion of the airframe to the top portion of the airframe. The plurality of connecting members comprises at least four connecting members. Such an arrangement of the airframe provides a suitable location for various hardware components of the aerial drone to be mounted, while providing enough space for the capturing device. Furthermore, such an arrangement of an airframe provides improved rotational stability to the aerial drone in all three axes of motion: yaw, pitch and roll. In particular, when heavier hardware components such as the power source are mounted to the bottom portion of the airframe instead of the top portion, the rotational inertia of the aerial drone about the yaw axis is beneficially reduced. This in turn ensures that the aerial drone can move or rotate about its yaw axis in a more effective and responsive manner.

The top portion of the airframe may be wider than the bottom portion of the airframe. In other words, the bottom portion of the airframe may be smaller than the top portion of the airframe. The central aperture defined by the top portion of the airframe may be wider than the bottom portion of the airframe.

The terms 'top' and 'bottom' refer to relative positions of different components of the aerial drone with respect to the ground, particularly during flight of the aerial drone. For example, the bottom portion of the airframe is configured to be closer to the ground during normal flight than the top portion of the airframe.

As discussed above, the aerial drone may comprise at least one power source, a flight guidance system, a flight control system and a detection sensor. At least one of the at least one power source, the flight guidance system, the flight control system and the detection sensor may be mounted to the bottom portion of the airframe. The capturing device may be mounted to the top portion of the airframe. The flight guidance system, the at least one power source and the detection sensor may be mounted to the bottom portion of the airframe. The bottom portion is located below the top portion of the airframe and below the capturing device, which is mounted to the top portion of the airframe. In embodiments where the capturing device comprises a net, the detection sensor may be mounted to the bottom portion in an elevated manner so that the detection sensor extends above the net. This ensures that the net is not obstructing the detection sensor during a capture mission of the aerial drone.

Alternatively, the flight guidance system and at least one power source may be mounted to the bottom portion of the airframe while the detection sensor may be mounted to the top portion of the airframe.

The bottom portion of the airframe may be a platform (mounting platform) located below the top portion of the airframe. The top portion of the airframe may define the central aperture, which is discussed above. The bottom portion of the airframe may be substantially aligned with the centre of the central aperture. The bottom portion of the airframe being located at a central position provides a suitable mounting position for various components, such as the flight guidance system, the detection sensor and the power source, of the aerial drone, so that the detection sensor can monitor targets from an advantageous central position and that some mass of the aerial drone is located central in order to increase the stability and agility of the aerial drone. Positioning the detection sensor below the capturing device ensures that the detection sensor can continue to monitor the foreign aerial object when it is received in the capturing zone defined by the capturing device.

The aerial drone may comprise a restraining element connected to the airframe and located above the capturing net. The restraining element is configured to reduce the upward movement of the capturing net in the vicinity of the propulsion system. In embodiments where the airframe comprises a bottom portion and a top portion, the restraining element may be attached to the top portion of the aerial drone. In embodiments where the airframe defines a central aperture and where the capturing device extends across the central aperture, the restraining element is configured to prevent the entanglement of the capturing net of the capturing device with the propellers of the propulsion system. The restraining element may comprise an elastic cord extending across the central aperture defined by the airframe.

The aerial drone may comprise a containment system configured to enclose an aerial object captured by the capturing device. The containment system may receive information from the catch detection mechanism or a proximity or contact sensor mounted to the airframe in order to determine whether an aerial object has been captured by the capturing device. The containment system may be configured to prevent access to or egress from the capturing device of a captured aerial object.

The airframe of the aerial drone may be formed from a plurality of modular structural members such that the airframe is configured to be assembled from the plurality of modular structural members. The plurality of modular structural members may comprise a plurality of bar members and a plurality of joining members, where the joining members are each configured to couple with a bar member. This enables the aerial drone to be scalable and easily assembled upon use. This way the size of the aerial drone can be adapted to the size of a particular aerial object a user wishes to capture.

In another embodiment, the airframe of the aerial drone does not define a central aperture. The aerial drone may comprise a support frame mounted to the airframe. The support frame may extend above from the airframe. The support frame may comprise a plurality of arm members configured to support a capturing device and elevate the capturing device above the airframe. The capturing zone may be defined by, or within, the capturing device located immediately above the airframe. In such embodiments, the capturing zone may be defined by, or within, the support frame located immediately above the airframe. The support frame and the capturing device may define a basket-like capturing mechanism for receiving and capturing foreign aerial objects.

The airframe may comprise a mounting portion. The mounting portion may comprise a central mounting platform. As discussed above, the aerial drone may comprise at least one power source, a flight guidance system, a flight control system and a detection sensor. At least one of the at least one power source, the flight guidance system, the flight control system and the detection sensor may be mounted to the mounting portion, or central mounting platform, of the airframe. The capturing device may be mounted above the mounting portion of the airframe. The support frame may be mounted to the mounting portion, or central mounting platform, of the airframe. The support frame may extend above, or upwards from, the mounting portion, or central mounting platform, of the airframe.

The flight guidance system, the at least one power source and the detection sensor may be mounted to the mounting portion of the airframe. Alternatively, the flight guidance system and the at least one power source may be mounted to the mounting portion of the airframe. The detection sensor may be mounted to the support frame, which may be mounted to the mounting portion or extend above the mounting portion.

Alternatively, the detection sensor may be mounted to a top portion of the support frame. In such cases, the detection sensor may be mounted to a pivotable support, which may be mounted to a top portion of the support frame. The pivotable support may comprise a gimbal. The support frame may comprise a support member extending between the top portions of two arm members. The support member may comprise a rod member extending between the top portions of two arm members. The support member provides a location on the top portion of the support frame to which the pivotable support and/or the detection sensor can be securely mounted.

The airframe may comprise a plurality of arms (or mounting arms) extending from the mounting portion of the airframe. The mounting portion may comprise a plurality of arms (or mounting arms). Each of the arm members of the support frame discussed above may be mounted to each of the arms of the airframe. The propellers of the propulsion system may be mounted to the bottom of such arms of the airframe or mounting portion. Accordingly, the propellers may face, or extend in, a downward direction. Mounting the propellers of the propulsion system to the bottom of the airframe provides more mounting space above and on top of the airframe for other components of the aerial drone to be mounted.

In another aspect of the invention, there is also provided a method of capturing an aerial object by approaching said aerial object from below (or underneath) with an aerial drone having a capturing device. The aerial drone may be an aerial drone of the present invention.

The method may comprise selecting an aerial object as a capture target and capturing the capture target by approaching the capture target from below such that the capture target is caught by the capturing device of the aerial drone. Selecting a particular aerial object may be done by using the detecting and tracking systems of the aerial drone.

As used herein, the terms "preferably," "may," and "optionally" refer to features of the present invention which are not essential, but which may be combined to form various embodiments of the invention.

Furthermore, any feature in one aspect of the invention may be applied to other aspects of the invention, in any appropriate combination. In particular, method aspects may be applied to apparatus aspects, and vice versa. Further, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF THE DRAWINGS

Specific embodiments will now be described with reference to the figures, in which.

DETAILED DESCRIPTION

Figure 1:
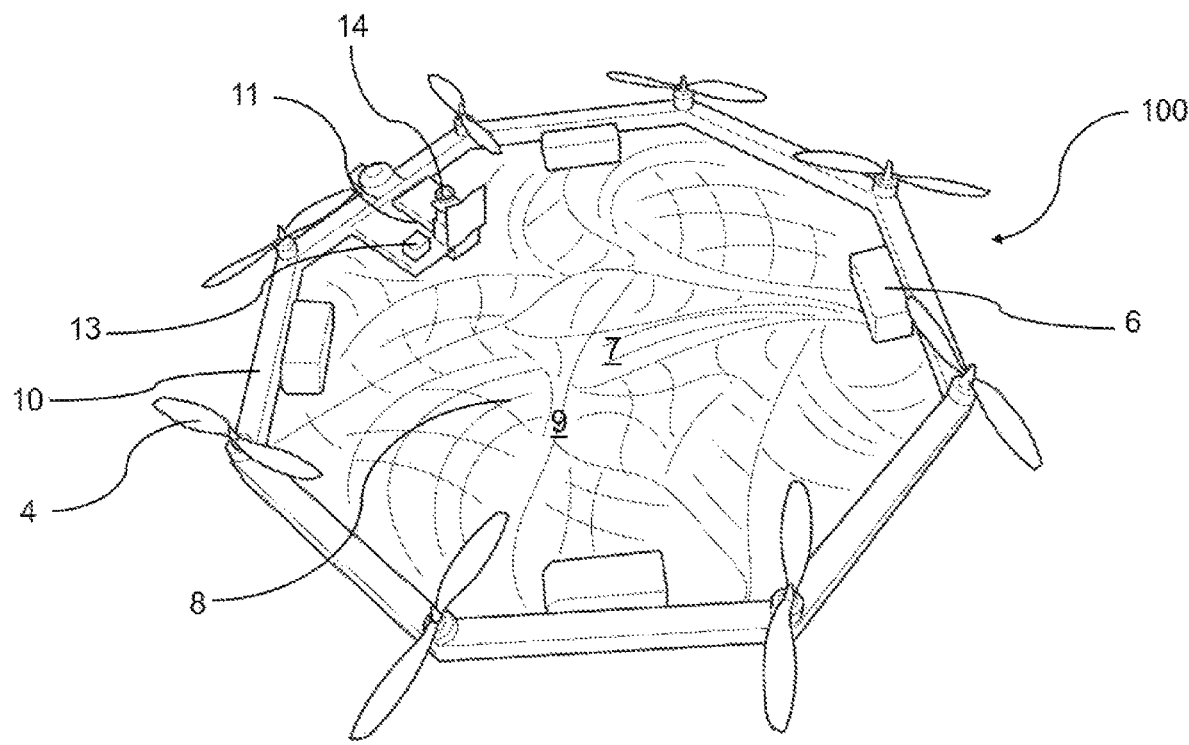
FIG. 1 shows a perspective view of a first embodiment of an aerial drone in accordance with the present invention.

FIG. 1 illustrates a first embodiment of an aerial drone 100 comprising an airframe 10 and a propulsion system 5 mounted to the airframe 10. In this first embodiment of the present invention, the airframe 10 is in the shape of an octagon and is made from aluminium. The propulsion system 5 comprises eight motorised propellers 4, eight corresponding motors 2 and eight corresponding electronic speed controllers (ESCs) 3. The propulsion system 5 is arranged to control the movement of the aerial drone 100 about its pitch, roll and yaw axes. The propulsion system 5 is also arranged to control the acceleration of the aerial drone 100 along the yaw axis of the aerial drone 100.

The shape of the airframe 10 is such that a central aperture 7 is defined within the aerial drone 100. A capturing device 8 is mounted to the airframe 10 and extends across and within the central aperture 7 of the aerial drone 100. The capturing device 8 consists of a capturing net. The capturing net is arranged to extend below the airframe 10 of the aerial drone 100. The capturing device defines a capturing zone 9 for receiving and capturing foreign aerial objects such as other aerial drones. The boundary of the capturing zone 9 is defined by the capturing device 8 itself and the periphery of the airframe 10, namely the inner periphery of the airframe 10.

The aerial drone 100 further comprises a plurality of batteries 6 mounted to the airframe 10. The embodiment shown in FIGS. 1 and 2 comprises a pair of 6S LiPo batteries. The batteries 6 are electrically connected to the components of the propulsion system 5 and any other electronic components mounted to the airframe 10 in order to provide these with power. Such other electronic components include an on-board computer 11. The on-board computer 11 may form part of a detecting system comprising at least one detection sensor 14, a tracking system and a flight guidance system.

In the present embodiment, the detection sensor 14 is a camera that is preferably configured to face upwards. The camera is mounted to gimbal (not shown) in order to stabilise the camera and to also orient the camera in different directions when required during flight.

Figure 2:
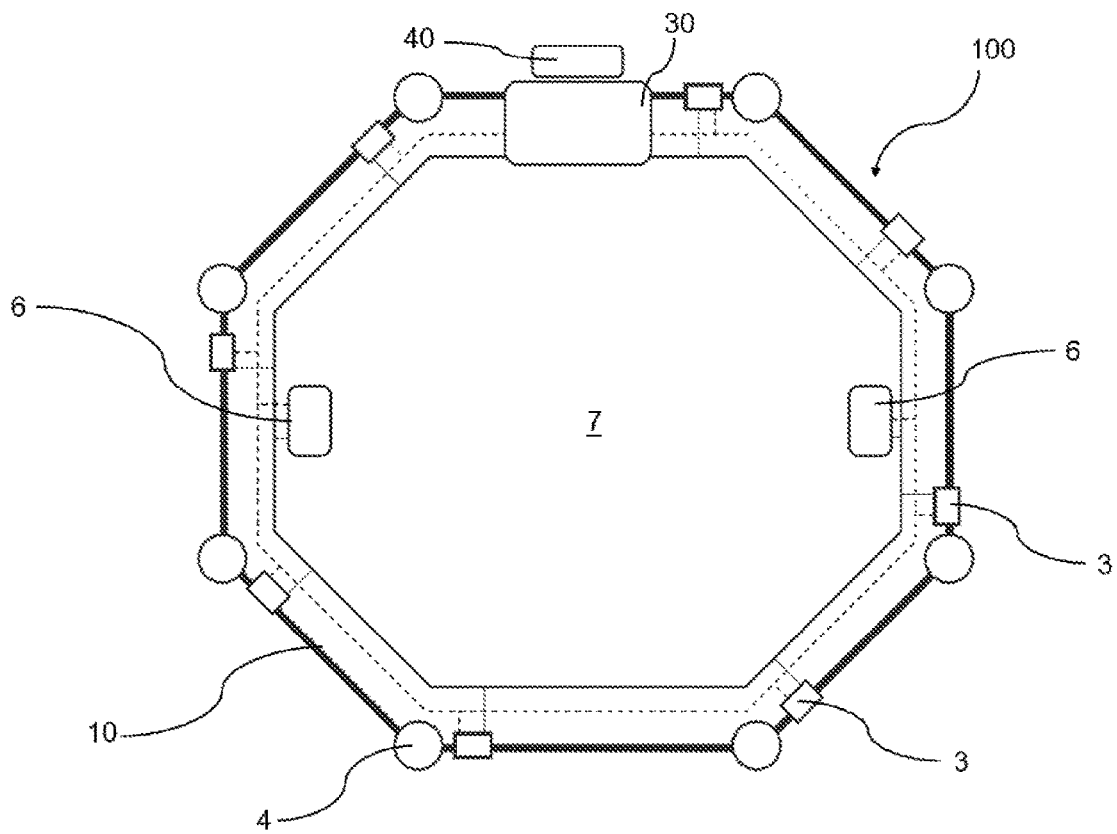
FIG. 2 shows a schematic plan view of a first embodiment of an aerial drone in accordance with the present invention.
Figure 3:
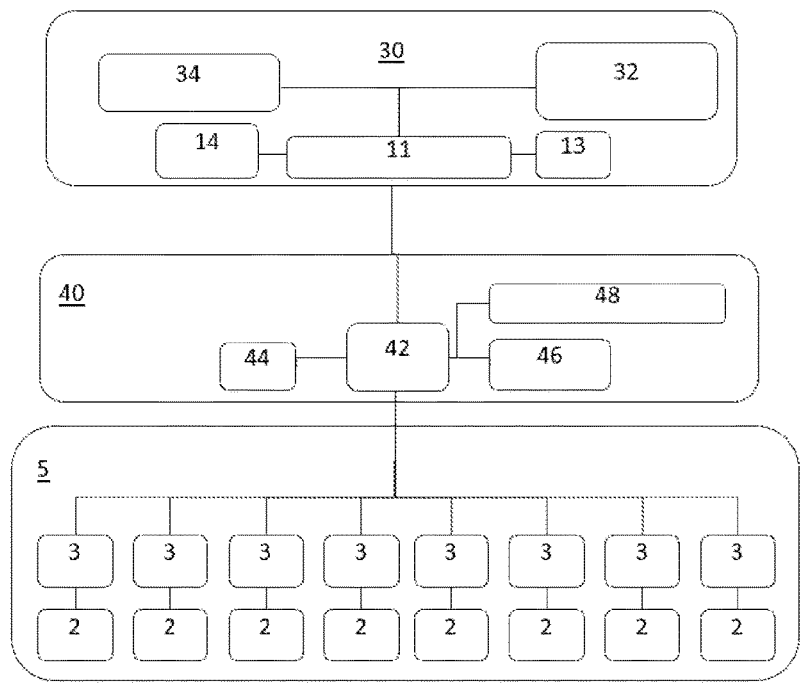
FIG. 3 shows a block diagram of components provided in a first embodiment of an aerial drone in accordance with present invention.

The aerial drone 100, as shown in FIGS. 1 and 2, comprises a first hardware kit 30 comprising the on-board computer 11, the detection sensor 14, a video communication system 32, a radio communication system 34 and an inertial measurement unit 13 (IMU), as shown in FIG. 3. The video communication system 32 transmits video data corresponding to the output of the detection sensor 14 to a remote user of the aerial drone. The radio communication system 34 enables electronic communication between a remote user and the flight guidance system of the aerial drone 100. The tracking and flight guidance systems are executed on the on-board computer 11.

The aerial drone 100, as shown in FIGS. 1 and 2, comprises a second hardware kit 40 comprising the flight controller 42, a GPS system 44, a radio control receiver 46 and a telemetry communication system 48, as shown in FIG. 3. The telemetry communication system 48 is configured to transmit flight controller data to a user. The flight controller 42 also includes a further IMU (not shown) and the information provided by such IMU is transmitted by the telemetry communication system 48. The radio control receiver 46 is configured to receive radio commands from a remote user. The GPS system 44 provides location information of the aerial drone.

Both the first and second hardware kits 30, 40 are electrically connected to the batteries 6 (two are shown in FIG. 2) and to the propulsion system 5. The batteries 6 provide power to the first and second hardware kits 30, 40. The first and second hardware kits 30, 40 are configured to provide electronic signals and commands to the propulsion system 5.

The first hardware kit 30 forms part of the tracking system and flight guidance system. The tracking system uses the information provided by the detection sensor 14 in order to target and track an aerial object detected by the detection sensor 14. As discussed above, the detection sensor 14 forms part of the first hardware kit 30. The tracking system automatically targets and tracks aerial objects detected by the detection sensor, by means of a computer program arranged to be executed on the on-board computer 11 in order to analyse the data received from the detection sensor 14. Alternatively, the computer program may be executed remotely and the data output from the computer program may be electronically communicated to the aerial drone 100. This may be the case where the aerial drone 100 does not comprise an on-board computer 11.

Where multiple aerial objects are detected by the tracking system, the tracking system may automatically select a particular aerial object to track or the tracking system may allow a user to select a particular aerial object to track by means of a user interface provided on a remote controller. The computer software or program of the tracking system is also able to provide identification information about an aerial object detected by the detection sensor 14. The tracking system can identify whether a particular aerial object is a bird or a drone, for example.

The flight guidance system communicates electronically with the tracking system and the flight control system, which comprises the flight controller 42. The tracking system provides tracking data concerning a targeted foreign aerial object to the flight guidance system. The tracking data comprises positional and attitude information concerning the targeted aerial object. The flight guidance system executes a computer program using the tracking data provided by the tracking system in order to produce flight guidance or flight path data. The flight guidance data includes command signals for the flight controller 42, which in turn produces signals for the propulsion system 5. The flight guidance system electronically communicates such command signals to the flight control system in order to guide the aerial drone 100 towards the targeted foreign aerial object on a particular flight path. The flight guidance system ensures that the aerial drone 100 is able to remain below and in the vicinity of the targeted aerial object.

The second hardware kit 40 forms part of the flight control system. The flight control system is electronically connected to the propulsion system 5 and is configured to provide motor control signals to the ESCs 3 of the propulsion system 5. As discussed above, the second hardware kit 40 includes a radio control receiver 46. The radio control receiver 46 is configured to receive radio commands from a user.

As shown in FIG. 3, the first hardware kit 30 and the second hardware kit 40 are electronically connected to each other and the second hardware kit 40 is electronically connected to the propulsion system 5.

Figure 4:
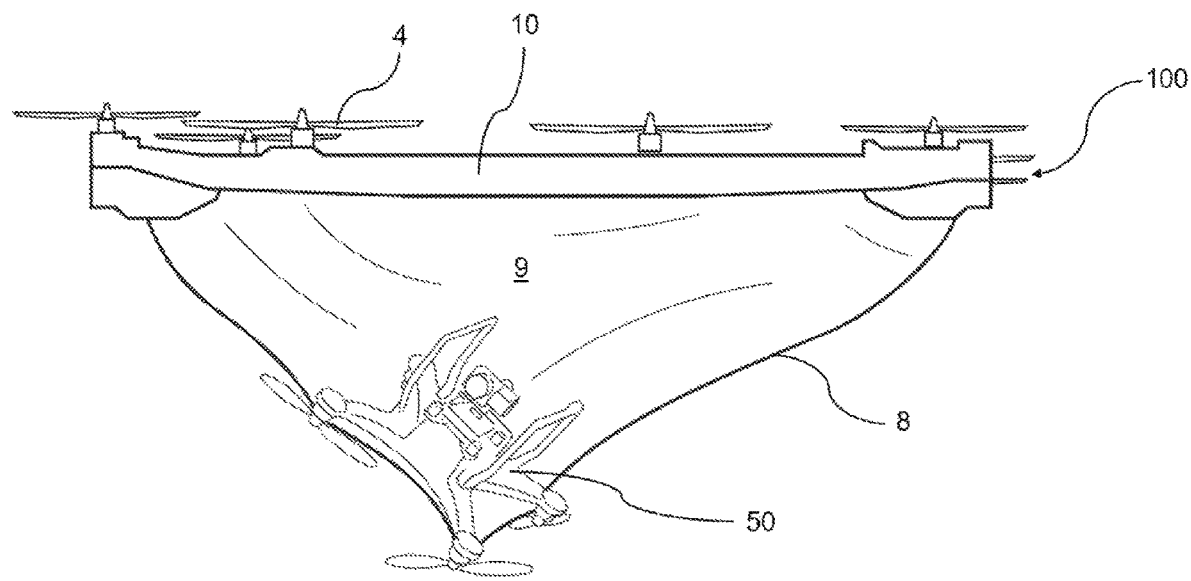
FIG. 4 shows a side view of a first embodiment of an aerial drone after capturing a foreign aerial object.

FIG. 4 shows the aerial drone 100 after having captured a foreign aerial drone 50. The aerial drone 100 is deployed and, mid-flight, the aerial drone 100 will detect the foreign aerial drone 50 with the detection sensor 14. The aerial drone 100 can target and track the detected foreign aerial drone 50 using the tracking system and the flight guidance system will instruct the flight controller 42 to transmit motor control outputs to the propulsion system 5 in order to position the aerial drone 100 immediately below the foreign aerial drone 50. Once the aerial drone 100 is tracking and following the foreign aerial drone 50 from below, a user of the aerial drone may instruct the aerial drone 100 to approach the foreign aerial drone 50 directly from below. As discussed above, the detecting system, tracking system, flight guidance system and flight control system cooperate with each other to ensure that the aerial drone 100 stays directly below the foreign aerial drone 50 during the approach. Alternatively, the approach of the aerial drone 100 to a targeted aerial drone may be automatic without the need for a user to send further commands. The foreign aerial drone 50 will encounter the capturing net of the capturing device 8 and the capturing device 8 of the aerial drone 100 will eventually receive and capture the foreign aerial drone 50 in the capturing zone 9. The propellers of the foreign aerial drone 50 entangle with the capturing net of the capturing device 8 such that the foreign aerial drone 50 will not be able to escape from the capturing device 8 by flying away.

Figure 5A:
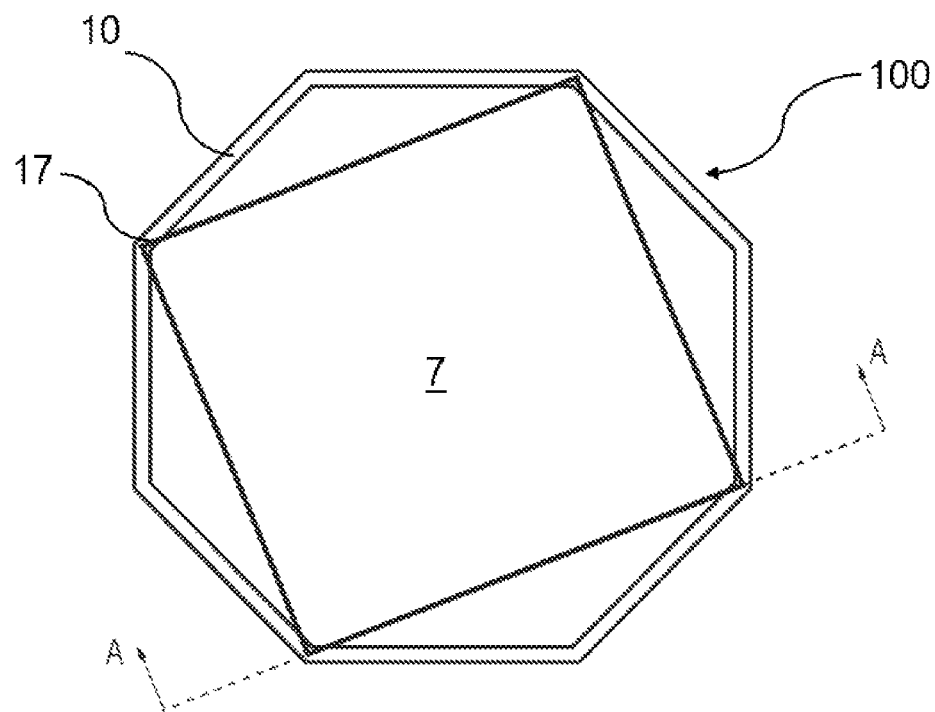
FIG. 5a shows a schematic top plan view of a first embodiment of an aerial drone comprising a restraining element.
Figure 5B:
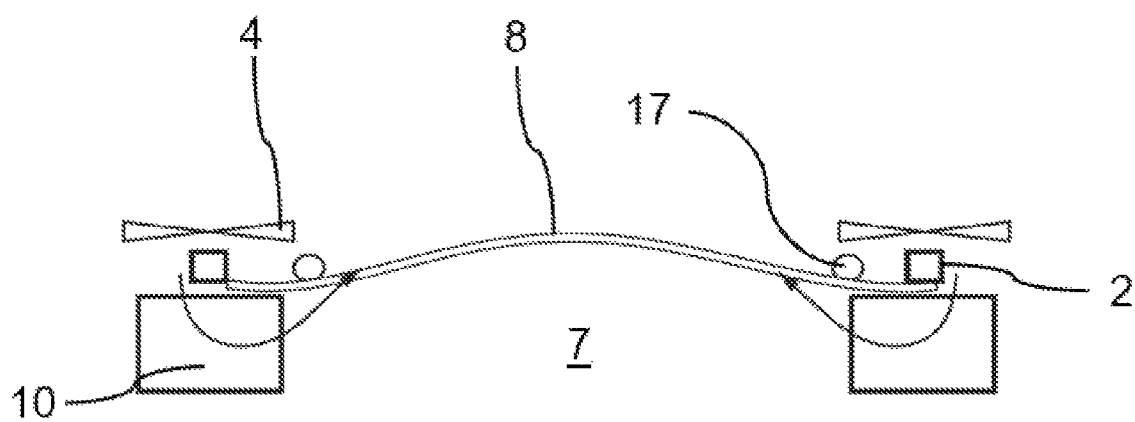
FIG. 5b shows a schematic cross-sectional view of FIG. 5a viewed along axis A-A.

FIGS. 5a & 5b show the first embodiment of the aerial drone 100 further comprising a restraining element 17. The restraining element 17 comprises an elastic cord extending across the capturing net of the capturing device 8. The elastic cord extends across the capturing net in the vicinity of the periphery of the capturing net. The elastic cord of the restraining element 17 is configured to prevent the capturing net from being entangled with the propellers 4 of the propulsion system 5. The capturing net is more likely to move upwards when the aerial drone 100 is in the vicinity of the ground due to the ground effect generated by the airflow created during operation of the propulsion system 5 or when the aerial drone 100 initiates a manoeuvre that involves a reduction in altitude, particularly in a sudden manner.

Figure 6:
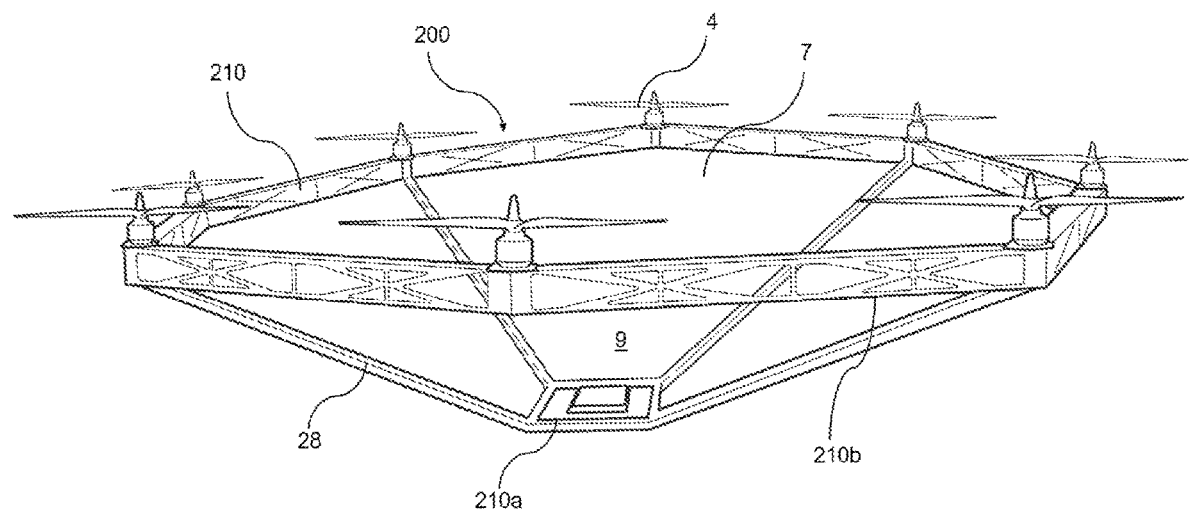
FIG. 6 shows a perspective view of a second embodiment of an aerial drone in accordance with the present invention.

FIG. 6 displays a second embodiment of the aerial drone of the present disclosure. The aerial drone 200 comprises similar components as the aerial drone 100. However, the airframe 210 of the aerial drone 200 comprises a bottom portion 210a and a top portion 210b. The top portion 210b defines a central aperture 7 of the aerial drone 200 and is similar to the airframe 10 of the first embodiment. The bottom portion 210a is located below the top portion 210b. Four connecting members 28 connect the bottom portion 210a to the top portion 210b. The connecting members 28 comprise rods of aluminium and the bottom and top portions 210a, 210b are also made of aluminium. The top portion 210b is wider than the bottom portion 210a. Furthermore, the central aperture 7 is wider than the bottom portion 210a of the airframe 210. In other words, the bottom portion 210a of the airframe 210 is smaller than the top portion 210b of the airframe 210. Accordingly, the airframe 210 is effectively in the shape of an inverted cone or pyramid.

The bottom portion 210a provides a platform for mounting various components of the aerial drone 200, such as the detection sensor 14 and/or the first hardware kit 30. The capturing device (not shown) is intended to be mounted to the top portion 210a and comprises a capturing net (not shown), similar to the aerial drone 100. The bottom portion 210b is arranged to be located below the capturing net of the capturing device. The bottom portion 210b is also arranged to be aligned with the centre of the capturing net of the capturing device.

The capturing zone 9 is located above the bottom portion 210b of the airframe 210 and within the airframe 210 structure. As discussed above, the capturing zone 9 is primarily defined by the capturing device 8.

Figure 7A:
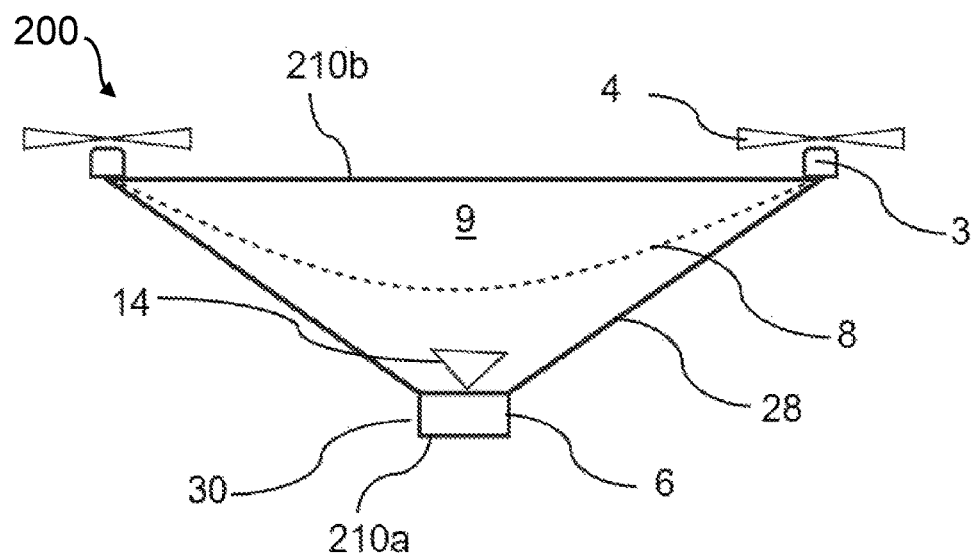
FIG. 7a shows a schematic side elevation view of an example of a second embodiment of an aerial drone in accordance with the present invention.
Figure 7B:
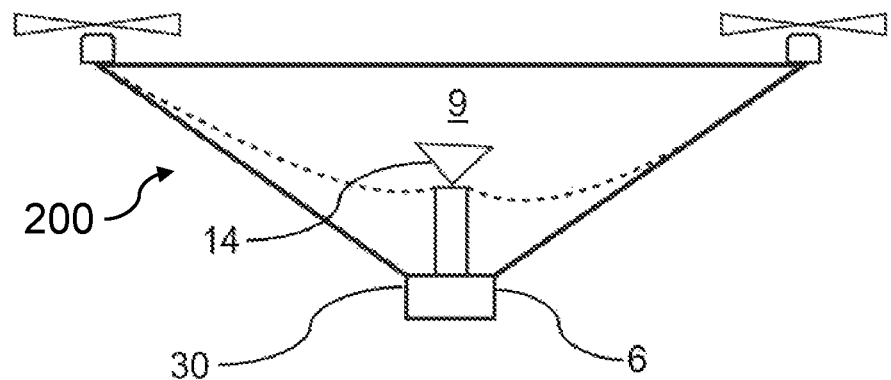
FIG. 7b shows a schematic side elevation view of another example of a second embodiment of an aerial drone in accordance with the present invention.
Figure 7C:
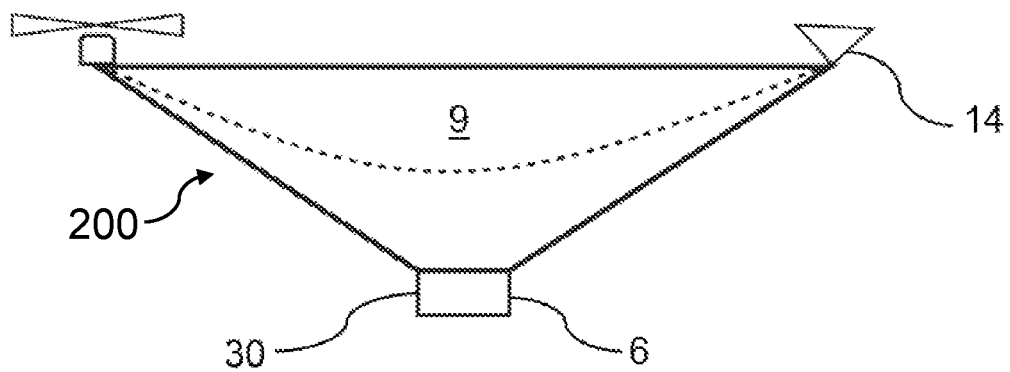
FIG. 7c shows a schematic side elevation view of another example of a second embodiment of an aerial drone in accordance with the present invention.

FIGS. 7a-7c illustrate three different examples of how the detection sensor 14, the first hardware kit 30 and the batteries 6 are mounted to the airframe 210 of the aerial drone 200. In these examples, the detection sensor 14 does not form part of the first hardware kit 30.

In the first example shown in FIG. 7a, the detection sensor 14, the first hardware kit 30 and the batteries 6 are mounted to the bottom portion 210a of the aerial drone 200. The detection sensor 14 is mounted below the capturing net of the capturing device 8.

In the second example shown in FIG. 7b, the detection sensor 14, the first hardware kit 30 and the batteries 6 are mounted to the bottom portion 210a of the aerial drone 200. The detection sensor 14 is elevated from the bottom portion 210a so that the detection sensor 14 is located above the capturing net of the capturing device 8.

In the third example shown in FIG. 7c, the first hardware kit 30 and the batteries 6 are mounted to the bottom portion 210a of the aerial drone 200. The detection sensor 14 is mounted to the top portion 210b.

In all examples shown in FIGS. 7a-7c, the detection sensor 14 is configured to face upwards (towards the sky) and may be mounted on a gimbal mounted to the airframe 200.

Figure 8A:
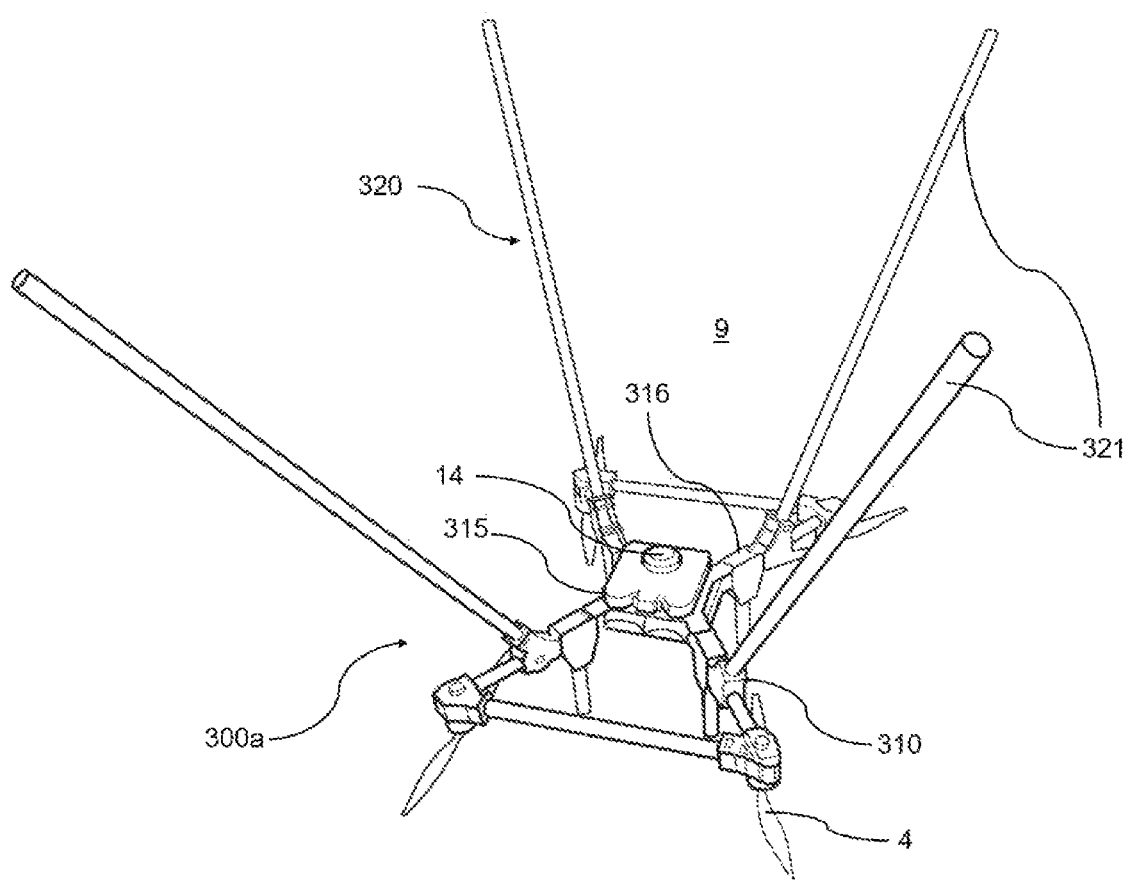
FIGS. 8a & 8b each show perspective views of examples of a third embodiment of an aerial drone in accordance with the present invention.
Figure 8B:
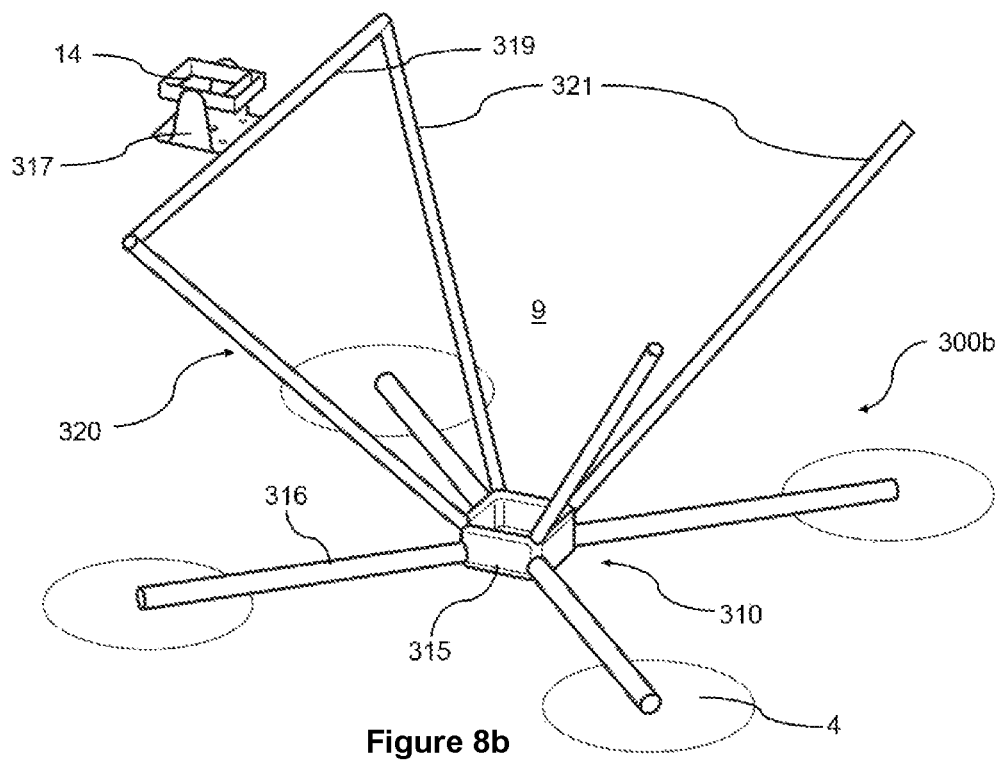

FIGS. 8a & 8b display examples of a third embodiment of an aerial drone. The aerial drone 300a, 300b comprises similar components as the first and second embodiments, aerial drones 100, 200. However, the airframe 310 of the aerial drone 300a, 300b does not define a central aperture.

The aerial drone 300a, 300b comprises a support frame 320 mounted to the airframe 310. The support frame 320 extends above from the airframe 310. The support frame 320 comprises a plurality of arm members 321 configured to support a capturing device (not shown in FIGS. 8a & 8b) and elevate the capturing device (not shown) above the airframe 310. The capturing zone 9 defined by the capturing device (not shown) and within the support frame 320 is located immediately above the airframe 310. The support frame 320 together with the capturing device (not shown) comprising a capturing net mounted to the support frame 320 define a basket-like capturing mechanism for receiving and capturing foreign aerial objects.

As shown in FIG. 8a, the first and second hardware kits 30, 40, the batteries 6 and the detection sensor 14 are mounted to a central mounting platform 315 of the airframe 310 of aerial drone 300a.

Alternatively, as shown in FIG. 8b, the detection sensor 14 can be mounted to the support frame 320 of aerial drone 300b, instead of the central mounting platform 315 of aerial drone 300a. Preferably, the detection sensor 14 is mounted to a top portion of the support frame 320. As shown in FIG. 8b, the detection sensor 14 is mounted to a pivotable support 317. The pivotable support 317 is mounted to a top portion of the support frame 320. The pivotable support 317 may comprise a gimbal. The support frame 320 comprises a support member 319 extending between the top portions of two arm members 321. The support member 319 provides a location on the top portion of the support frame 320 to which the pivotable support 317 and/or the detection sensor 14 can be securely mounted.

As shown in FIGS. 8a & 8b, the airframe 310 also comprises four arms 316 extending from the central mounting platform 315. The propulsion system 305 of the aerial drone 300 differs from aerial drones 100, 200 in that the propellers 4 are mounted to the bottom of the airframe 310 and on the arms 316. This provides more mounting space above the airframe 310, particularly for mounting of the support frame 320. Each of the arm members 321 of the support frame 320 may be mounted to each of the arms 316 of the airframe 310, as shown in FIG. 8a, or to the central mounted platform 315, as shown in FIG. 8b.

The aerial drones 200, 300a, 300b of the second and third embodiments operate in a similar manner to the aerial drone 100 of the first embodiment when capturing foreign aerial objects.

The specific embodiments and examples described above illustrate but do not limit the invention. It is to be understood that other embodiments of the invention may be made and the specific embodiments and examples described herein are not exhaustive.

Further examples of the present disclosure or invention can be described with reference to following numbered clauses:

1. An aerial drone comprising: an airframe; a propulsion system mounted to the airframe, the propulsion system being configured to control the movement of the aerial drone; and a capturing device mounted to the airframe, the capturing device being configured to receive and capture an aerial object located above the aerial drone.

2. An aerial drone according to clause 1, wherein the capturing device is configured to define a capturing zone for receiving an aerial object, the capturing zone being configured to be accessible from above the capturing device.

3. An aerial drone according to any preceding clause, wherein the capturing device is mounted on top of the airframe.

4. An aerial drone according to clause 3, wherein the aerial drone comprises a support frame mounted to the airframe, wherein the support frame is configured to support the capturing device and elevate the capturing device above the airframe.

5. An aerial drone according to any preceding clause, wherein the airframe defines a central aperture and wherein the capturing device is configured to extend across the central aperture of the airframe.

6. An aerial drone according to clause 4 or 5, wherein the capturing device is located within the central aperture of the airframe.

7 An aerial drone according to any preceding clause, wherein the airframe is circular or is in the shape of a polygon.

8. An aerial drone according to any one of clauses 5 to 7, wherein a width of the central aperture is greater than 100 centimetres.

9. An aerial drone according to any preceding clause, wherein the propulsion system comprises at least six propellers and at least six motors each configured to operate a corresponding propeller, wherein both the propellers and corresponding motors are evenly distributed on the airframe.

10. An aerial drone according to clause 9, wherein the aerial drone further comprises a plurality of propeller guards for preventing the capturing device from being caught by the propellers, wherein each propeller guard is mounted to the airframe at a location in the vicinity of a corresponding propeller.

11. An aerial drone according to any preceding clause, wherein the aerial drone further comprises a power source for providing power to the propulsion system.

12. An aerial drone according to any preceding clause, wherein the aerial drone comprises a catch detection system configured to detect whether an aerial object has been caught by the capturing device.

13. An aerial drone according to clause 12, wherein the catch detection system is configured to monitor the acceleration of the aerial drone with respect to motor speed commands provided by a flight control system to the propulsion system and wherein the catch detection system is further configured to determine based on such motor speed commands and the monitored acceleration of the aerial drone whether an aerial object has been captured by the capturing device of the aerial drone.

14. An aerial drone according to any preceding clause, wherein the aerial drone further comprises a detecting system mounted to the airframe configured to detect the presence of an aerial object.

15. An aerial drone according to clause 14, wherein the detecting system comprises a detection sensor configured to face upwards.

16. An aerial drone according to clause 14 or 15, wherein the detecting system comprises a tracking system for targeting and tracking an aerial object based on detection sensor data received from the detection sensor.

17. An aerial drone according to any one of clauses 14 to 16, wherein the tracking system is configured to provide identification information about an aerial object.

18. An aerial drone according to any preceding clause, wherein the aerial drone is configured to communicate with a flight guidance system such that a flight path of the aerial drone can be controlled.

19. An aerial drone according to clauses 16 and 18, wherein the flight guidance system is configured to receive tracking data from the tracking system.

20. An aerial drone according to clause 19, wherein the aerial drone further comprises an inertial measurement unit (IMU) configured to provide navigational data relating to the aerial drone to the flight guidance system, further wherein the flight guidance system is configured to determine the location of an aerial object relative to the aerial drone.

21. An aerial drone according to clauses 16 and 18, wherein the aerial drone further comprises an on-board computer, wherein the on-board computer forms part of the tracking system and the flight guidance system.

22. An aerial drone according to clause 5 or any clause dependent on clause 5, wherein the airframe comprises a top portion and a bottom portion, wherein the top portion defines the central aperture of the airframe and the bottom portion is located below the centre of the central aperture.

23. An aerial drone according to clause 22, wherein the airframe comprises a plurality of connecting members connecting the bottom portion of the airframe to the top portion of the airframe.

24. An aerial drone according to clause 23, wherein the plurality of connecting members comprises at least four connecting members.

25. An aerial drone according to any one of clauses 22 to 24, wherein the aerial drone comprises a power source, a flight guidance system, a flight control system and a detection sensor, and wherein at least one of the power source, the flight guidance system, the flight control system and the detection sensor is mounted to the bottom portion of the airframe.

26. An aerial drone according to clause 25, wherein the detection sensor is mounted below or above the capturing device.

27. An aerial drone according to any preceding clause, wherein the capturing device comprises a capturing net.

28. An aerial drone according to clause 27, wherein the aerial drone comprises a restraining element connected to the airframe and located above the capturing net, the restraining element being configured to reduce the upward movement of the capturing net in the vicinity of the propulsion system.

29. An aerial drone according to clause 28, wherein the restraining element comprises an elastic cord extending across the central aperture defined by the airframe.

30. An aerial drone according to any preceding clause, wherein the aerial drone comprises a containment system configured to enclose an aerial object captured by the capturing device.

31. An aerial drone according to any preceding clause, wherein the airframe is formed from a plurality of modular structural members such that the airframe is configured to be assembled from the plurality of modular structural members.

32. An aerial drone according to clause 31, wherein the plurality of modular structural members comprises a plurality of bar members and a plurality of joining members, the joining members each being configured to couple with a bar member.

33. A method of capturing an aerial object using an aerial drone in accordance with any of the preceding clauses.

34. A method of capturing an aerial object according to clause 33, the method comprising: selecting an aerial object as a capture target; and capturing the capture target by approaching the capture target from below such that the capture target is caught by the capturing device of the aerial drone.

The invention claimed is:
1. An aerial drone comprising:
an airframe;

a propulsion system mounted to the airframe, the propulsion system being configured to control the movement of the aerial drone;

a capturing device mounted to the airframe, the capturing device being configured to receive and capture an aerial object located above the aerial drone; and a catch detection system configured to detect whether the aerial object has been caught by the capturing device, wherein the catch detection system is configured to monitor the acceleration of the aerial drone with respect to motor speed commands provided by a flight control system of the propulsion system and wherein the catch detection system is further configured to determine based on such motor speed commands and the monitored acceleration of the aerial drone whether the aerial object has been captured by the capturing device.

2. An aerial drone according to claim 1, wherein the capturing device is configured to define a capturing zone for receiving the aerial object, the capturing zone being configured to be accessible from above the capturing device.

3. An aerial drone according to claim 1, wherein the aerial drone comprises a support frame mounted to the airframe, wherein the support frame is configured to support the capturing device and elevate the capturing device above the airframe.

4. An aerial drone according to claim 1, wherein the airframe defines a central aperture and wherein the capturing device is configured to extend across the central aperture of the airframe.

5. An aerial drone according to claim 4, wherein the airframe comprises a top portion and a bottom portion, wherein the top portion defines the central aperture of the airframe and the bottom portion is located below the centre of the central aperture.

6. An aerial drone according to claim 5, wherein the airframe comprises a plurality of connecting members connecting the bottom portion of the airframe to the top portion of the airframe.

7. An aerial drone according to claim 5, wherein the aerial drone comprises a power source, a flight guidance system, a flight control system and a detection sensor, and wherein at least one of the power source, the flight guidance system, the flight control system and the detection sensor is mounted to the bottom portion of the airframe.

8. An aerial drone according to claim 5, wherein the bottom portion of the airframe is substantially aligned with the centre of the central aperture.

9. An aerial drone according to claim 1, wherein the aerial drone further comprises a detecting system mounted to the airframe configured to detect the presence of the aerial object.

10. An aerial drone according to claim 9, wherein the detecting system comprises a detection sensor configured to face upwards.

11. An aerial drone according to claim 9, wherein the detecting system comprises a tracking system for targeting and tracking the aerial object based on detection sensor data received from the detection sensor.

12. An aerial drone according to claim 11, wherein the tracking system is configured to provide identification information about the aerial object.

13. An aerial drone according to claim 1, wherein the aerial drone is configured to communicate with a flight guidance system such that a flight path of the aerial drone can be controlled.

14. An aerial drone according to claim 13, wherein the flight guidance system is configured to receive tracking data from the tracking system.

15. An aerial drone according to claim 14, wherein the aerial drone further comprises an inertial measurement unit (IMU) configured to provide navigational data relating to the aerial drone to the flight guidance system, further wherein the flight guidance system is configured to determine the location of the aerial object relative to the aerial drone.

16. An aerial drone according to claim 13, wherein the aerial drone further comprises an on-board computer, wherein the on-board computer forms part of the tracking system and the flight guidance system.

17. An aerial drone according to claim 1, wherein the aerial drone comprises a restraining element connected to the airframe and located above the capturing device, the restraining element being configured to reduce the upward movement of the capturing device in the vicinity of the propulsion system.

18. An aerial drone according to claim 1, wherein the airframe is formed from a plurality of modular structural members such that the airframe is configured to be assembled from the plurality of modular structural members.

19. An aerial drone according to claim 18, wherein the plurality of modular structural members comprises a plurality of bar members and a plurality of joining members, the joining members each being configured to couple with a bar member.

* * * * *